(12) United States Patent
Cyrille et al.

(10) Patent No.: US 7,765,676 B2
(45) Date of Patent: Aug. 3, 2010

(54) METHOD FOR PATTERNING A MAGNETORESISTIVE SENSOR

(75) Inventors: Marie-Claire Cyrille, San Jose, CA (US); Elizabeth Ann Dobisz, San Jose, CA (US); Wipul Pemsiri Jayasekara, Los Gatos, CA (US); Jui-Lung Li, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 661 days.

(21) Appl. No.: 10/993,499

(22) Filed: Nov. 18, 2004

(65) Prior Publication Data

US 2006/0101636 A1    May 18, 2006

(51) Int. Cl.
*G11B 5/187* (2006.01)
*B44C 1/22* (2006.01)
(52) U.S. Cl. .............. 29/603.12; 29/603.16; 29/603.18; 216/22; 216/42; 216/47; 216/48; 360/314; 360/320; 427/496; 427/595
(58) Field of Classification Search . 29/603.12–603.16, 29/841, 603.18; 430/5; 427/128, 130, 131, 427/496, 595; 216/22, 41, 47, 48, 42; 252/514; 360/314, 319, 320
See application file for complete search history.

(56) References Cited

U.S. PATENT DOCUMENTS

| | | | | |
|---|---|---|---|---|
| 3,756,834 A | * | 9/1973 | Short ..................... 252/514 X |
| 5,215,867 A | * | 6/1993 | Stillwagon et al. ........ 216/47 X |
| 6,218,056 B1 | * | 4/2001 | Pinarbasi et al. ............... 430/5 |
| 6,325,900 B1 | * | 12/2001 | Komuro et al. ....... 29/603.14 X |
| 6,428,714 B1 | * | 8/2002 | Torng et al. ............... 216/47 X |
| 6,669,983 B2 | * | 12/2003 | Kagami et al. .......... 427/131 X |
| 2002/0196647 A1 | | 12/2002 | Nickel .......................... 365/46 |
| 2003/0038106 A1 | | 2/2003 | Covington et al. ............. 216/2 |
| 2003/0181056 A1 | | 9/2003 | Kumar et al. ................ 438/710 |
| 2004/0023502 A1 | | 2/2004 | Tzou et al. .................. 438/706 |
| 2004/0047199 A1 | | 3/2004 | Hosotani et al. ............ 265/200 |
| 2004/0100855 A1 | | 5/2004 | Saito et al. .................. 365/232 |

FOREIGN PATENT DOCUMENTS

JP    2004-311484    * 11/2004

\* cited by examiner

*Primary Examiner*—A. Dexter Tugbang
(74) *Attorney, Agent, or Firm*—Zilka-Kotab, PC

(57) ABSTRACT

A method for constructing a magnetoresistive sensor using an etch mask that is resistant to the material removal process used to define the sensor width and stripe height. The method may include the use of a Ta etch mask formed under a photoresist mask, and the use of an ion milling process to define the sensor. The etch mask remains substantially intact after performing the ion milling and therefore is readily removed by a later CMP process. The etch mask layer is also very resistant to high temperatures such as those used in a desired atomic layer deposition of alumina, which is used to deposit conformal layers of alumina around the sensor.

13 Claims, 9 Drawing Sheets

METHOD FOR PATTERNING A MAGNETORESISTIVE SENSOR

FIELD OF THE INVENTION

The present invention relates to the manufacture of magnetoresitive sensors and more particularly to the patterning of a magnetoresistive sensor using an etch mask patterned by a photoresist mask.

BACKGROUND OF THE INVENTION

The heart of a computer is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider into contact with the surface of the disk when the disk is not rotating but, when the disk rotates, a thin layer of air develops between the slider and the rotating disk. When the slider rides on this air bearing, the write and read heads are employed for writing magnetic impressions to and reading magnetic impressions from the rotating disk. The read and write heads are connected to processing circuitry that operates according to a computer program to implement the writing and reading functions.

The write head includes a coil layer embedded in insulation layers (insulation stack), the insulation stack being sandwiched between first and second pole piece layers. A gap is formed between the first and second pole piece layers by a gap layer at an air bearing surface (ABS) of the write head and the pole piece layers are connected at a back gap. Current conducted to the coil layer induces a magnetic flux in the pole pieces which causes a magnetic field to fringe out at a write gap at the ABS for the purpose of writing the aforementioned magnetic impressions in tracks on the moving media, such as in circular tracks on the aforementioned rotating disk.

In recent read head designs a spin valve sensor, also referred to as a giant magnetoresistive (GMR) sensor, has been employed for sensing magnetic fields from the rotating magnetic disk. The sensor includes a nonmagnetic conductive layer, hereinafter referred to as a spacer layer, sandwiched between first and second ferromagnetic layers, hereinafter referred to as a pinned layer and a free layer. First and second leads are connected to the spin valve sensor for conducting a sense current therethrough. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to cos θ, where θ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

When a spin valve sensor employs a single pinned layer it is referred to as a simple spin valve. When a spin valve employs an antiparallel (AP) pinned layer it is referred to as an AP pinned spin valve. An AP spin valve includes first and second magnetic layers separated by a thin non-magnetic coupling layer such as Ru. The thickness of the spacer layer is chosen so as to antiparallel couple the magnetizations of the ferromagnetic layers of the pinned layer. A spin valve is also known as a top or bottom spin valve depending upon whether the pinning layer is at the top (formed after the free layer) or at the bottom (before the free layer).

The spin valve sensor is located between first and second nonmagnetic electrically insulating read gap layers and the first and second read gap layers are located between ferromagnetic first and second shield layers. In a merged magnetic head a single ferromagnetic layer functions as the second shield layer of the read head and as the first pole piece layer of the write head. In a piggyback head the second shield layer and the first pole piece layer are separate layers.

Magnetization of the pinned layer is usually fixed by exchange coupling one of the ferromagnetic layers (AP1) with a layer of antiferromagnetic material such as PtMn. While an antiferromagnetic (AFM) material such as PtMn does not in and of itself have a magnetization, when exchange coupled with a magnetic material, it can strongly pin the magnetization of the ferromagnetic layer.

Traditionally, GMR sensors have been constructed as current in plane (CIP) GMR sensors, wherein current flows through the sensor from one side to the other in a direction parallel with the planes of the layers making up the sensor. More recently, increased attention has been focused on current perpendicular to plane (CPP) GMR sensors. As its name suggests, in a CPP sensor, current flows through the sensor from top to bottom in a direction perpendicular to the planes of the layers making up the sensor.

Another type of magnetoresistive sensor is a tunnel magnetoresistance (TMR) sensor or tunnel valve. A tunnel valve includes a pinned layer and a free layer, similar to a GMR sensor. However, instead of having a non-magnetic electrically conductive spacer layer between the free and pinned layers, a tunnel valve has a thin dielectric, non-magnetic barrier layer, which can be constructed of for example alumina $Al_2O_3$. A tunnel valve operates based on the spin dependent tunneling of electrons through the thin barrier layer. When the magnetic moments of the free and the pinned layer are aligned parallel with one another, electrons much more readily pass through the barrier layer than when they are the moments are antiparallel. Therefore, current travels through a tunnel valve in a direction perpendicular to the plane of the layers making up the sensor, similar to a current perpendicular to plane (CPP) GMR.

Both CPP GMR sensors and tunnel valves have sense current conducted by first and second leads that generally are constructed of a magnetic material to act as magnetic shields and which contact the top and bottom of the sensor. Both CPP and GMR sensors, therefore, also require the inclusion of some sort of electrical insulation to cover the sides of the sensor as well as at least one of the leads in areas outside of the sensor, in order to prevent current from being shunted between the leads. One process that is currently being used to deposit such a layer of insulation is atomic layer deposition of alumina. This process has the desired ability to apply a thin uniform layer of alumina on both the side vertical surfaces of the sensor as well as the top (horizontal) surface of the bottom lead. This procedure, however, requires the application of high temperatures, which can be problematic for reasons that will be discussed below.

Magnetoresistive sensors have been constructed by a method that includes first depositing the sensor layers as full film layers. Then, a full film layer of CMP resistant material is deposited. A mask that includes one or more layers of a polymer material such as photoresist is then formed to cover the area where the sensor is desired and exposing other portions. An etching process is then used to remove the CMP resistant material and portions of the sensor layers outside of the sensor area.

This process for defining the sensor has various limitations, especially for use in current perpendicular to plane (CPP) sensors, which are the desired sensors for use in future magnetic recording products. As discussed above, the prior art process uses a polymer mask. It turns out that the manufacture of CPP sensors requires a relatively long etch in the case of in-stack stabilized CPP sensors and/or an etch in a harsh reactive ion etch (RIE) chemistry to properly define the sensor stack. This type of etch removes an excessive amount of the polymer mask, which is not sufficiently resistant to the etching process. After the sensor stack has been defined, a fill material such as a dielectric material and/or magnetic material are deposited. A chemical mechanical polishing process (CMP) is used to remove the remaining mask. CMP processes preferentially remove material that has a high topography (ie. sticks up beyond the other structures). If a sufficient amount of mask remains after defining the sensor stack, then the CMP will be able to effectively remove this remaining mask. However, as mentioned above, the polymer mask presently used is not sufficiently resistant to the etching processes currently needed to define the sensor stack. As a result, the excessively thin remaining mask material does not have a high enough topography to be removed by the CMP. It then becomes difficult to remove the mask after the sensor has been defined and the fill material has been deposited.

To make matters worse, processes used to manufacture the desired CPP sensors future generation magnetic heads involve the application relatively high temperatures. For example, the use of atomic layer deposition (ALD) of alumina, which provides a desired conformal layer of alumina $Al_2O_3$ requires the application of high temperatures. These high temperatures hard bake the polymer mask, making the mask even more difficult to remove, or worse yet cause the mask to shrivel up and become completely ineffective.

Therefore, there is a strong felt need for a method for defining a sensor stack of a magnetoresistive sensor, wherein the method is compatible with the long etches and/or etching using harsh reactive etch chemistries and high temperature processes needed to construct current and future generation magnetic heads. Such a method would preferably involve the use of a mask that can maintain a sufficient amount of topography after such etching that the mask can be readily removed by CMP. Such a method would also preferably involve the use of a mask that will not be negatively affected by high temperatures needed to construct such current and future generation magnetic heads.

SUMMARY OF THE INVENTION

The present invention provides method for constructing a magnetoresistive sensor in which the mask used to define the sensor width and stripe height can be readily removed after formation of the sensor. After depositing a series of sensor layers a layer of CMP stop material is deposited, followed by a layer of etch mask material and layer of photoresist material. The photoresist layer is photolithographically patterned to form a mask and the pattern is transferred to the underlying etch mask layer and CMP stop layer using a technique such as reactive ion etching (RIE). This RIE process will be chosen to etch the mask layer and the CMP stop layer, but not etch the underlying sensor material. A material removal process is then performed to remove a desired amount of sensor material, thereby defining the sensor width and stripe height. The material used as the etch stop layer is a material that is resistant to removal by the material removal process used to define the sensor.

The etch mask layer, being constructed of a material that is resistant to the material removal process used to define the sensor advantageously remains substantially intact during the sensor material removal process. This advantageously provides a high topography to allow easy removal by a subsequent CMP process.

The etch stop layer is also advantageously resistant to high temperatures such as those used in atomic layer deposition of alumina. The etch mask can therefore, be readily removed after the sensor has been formed. This is a significant advantage over prior art etch masks that become hard baked or, worse, shrivel when subjected to such high temperatures.

The etch mask can be, for example, Ta and the sensor material removal process can be for example ion milling. After defining the sensor stack, a fill layer can be deposited. An optional layer of CMP resistant material may then be deposited, and a chemical mechanical polishing process can be performed to remove the etch mask. The CMP stop as well as the later applied CMP resistant material may be diamond like carbon (DLC) or some other material.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

BEST MODE FOR CARRYING OUT THE INVENTION

The following description is of the best embodiments presently contemplated for carrying out this invention. This description is made for the purpose of illustrating the general principles of this invention and is not meant to limit the inventive concepts claimed herein.

Figure 1:
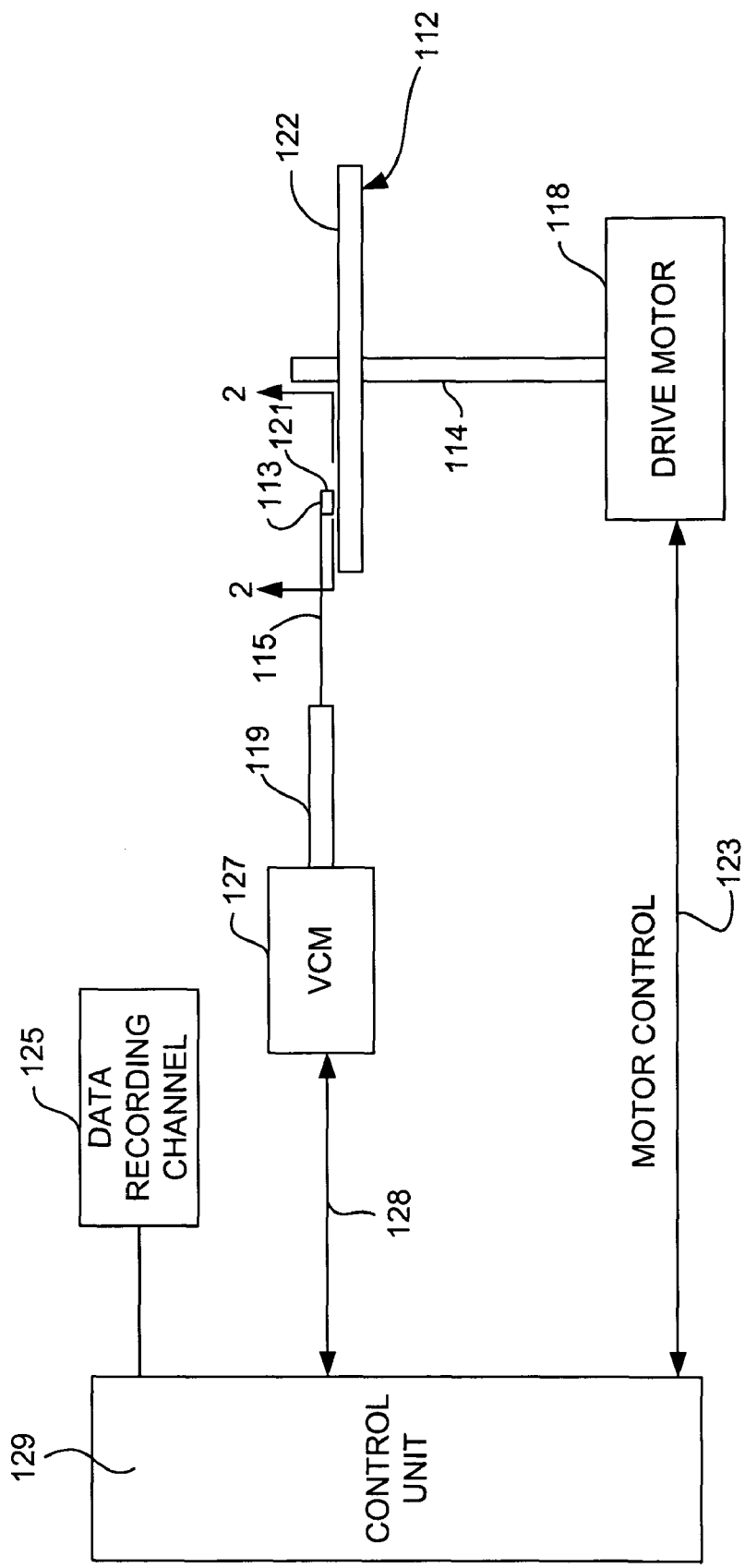
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
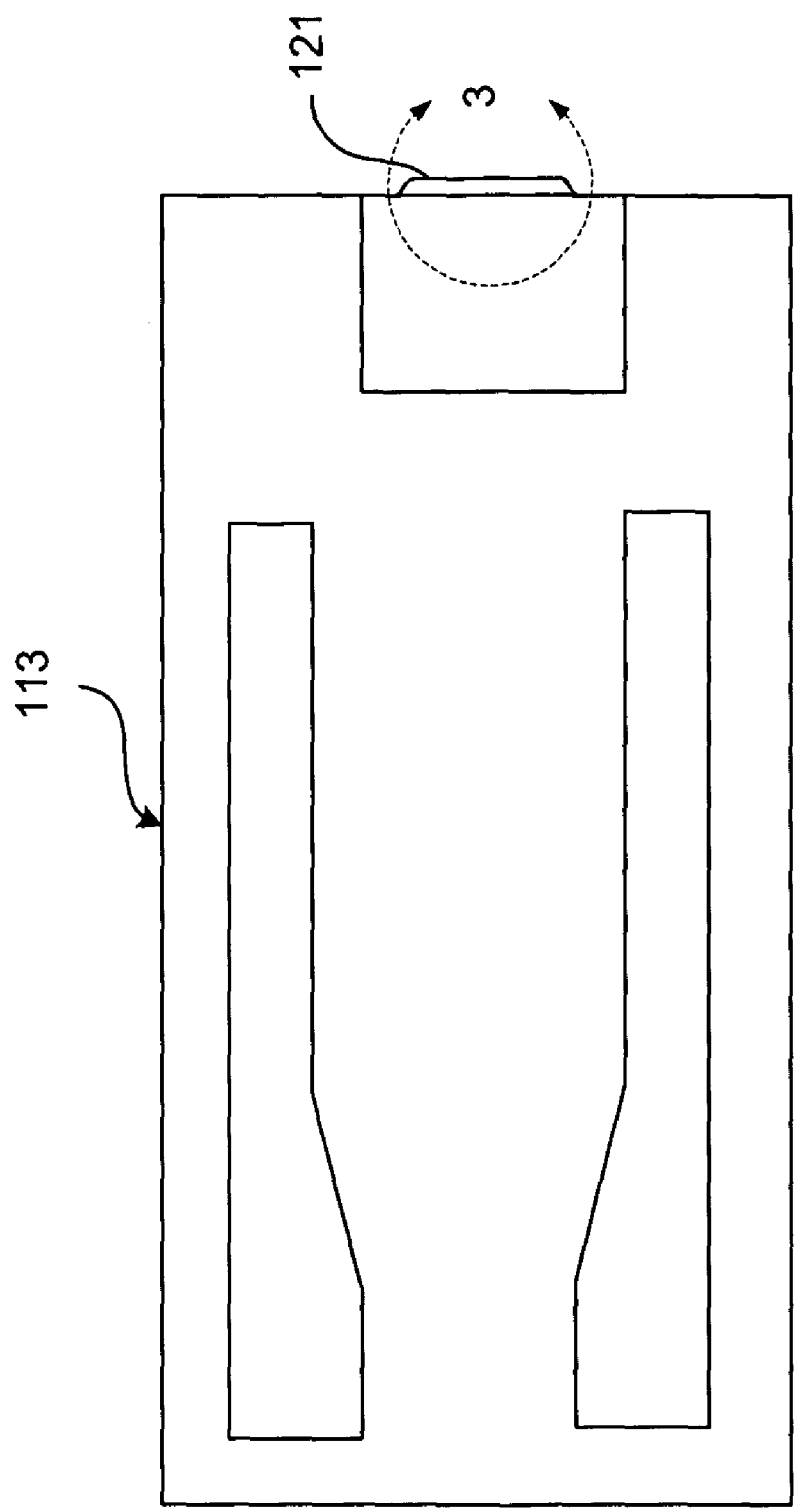
FIG. 2 is an ABS view of a slider illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system, and the accompanying illustration of FIG. 1 are for representation purposes only. It should be apparent that disk storage systems may contain a large number of disks and actuators, and each actuator may support a number of sliders.

Figure 3:
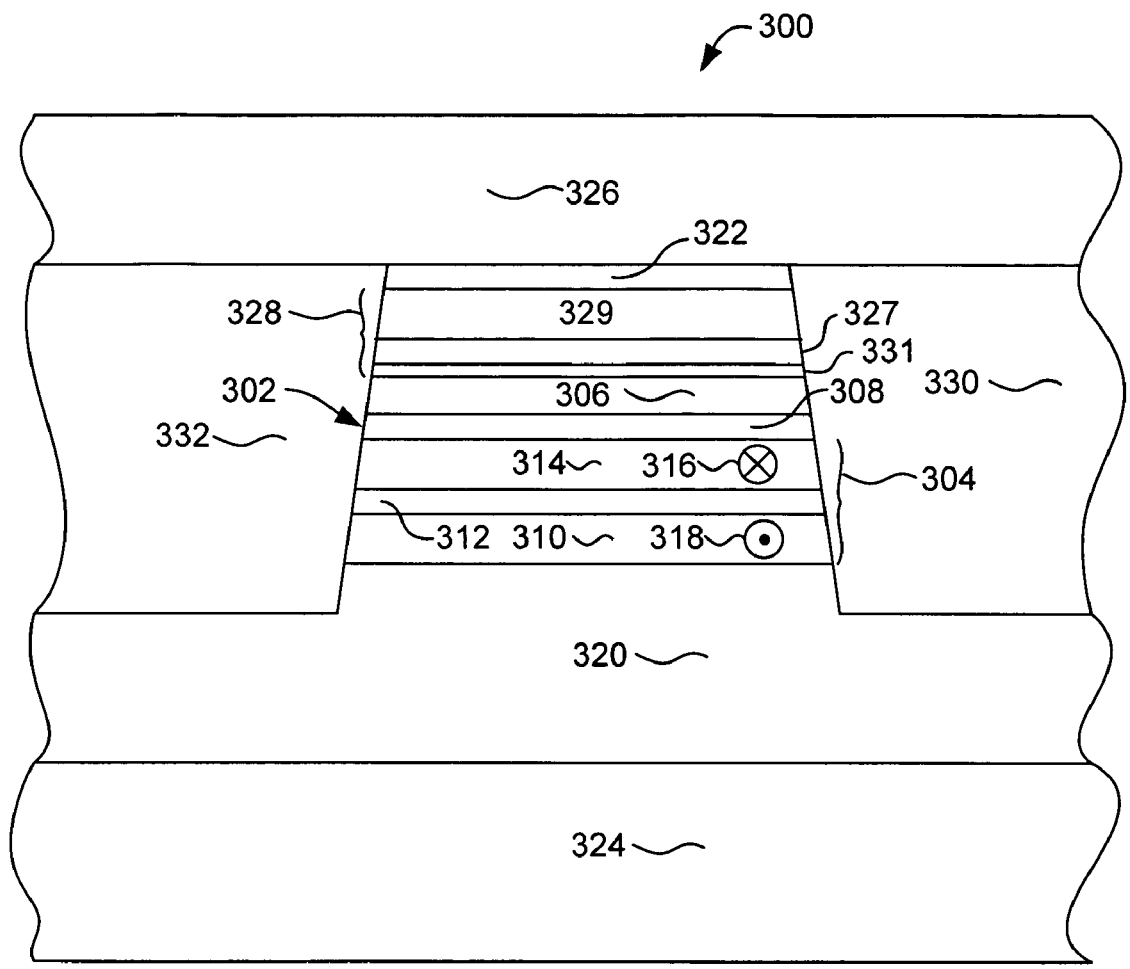
FIG. 3 is an ABS view of a magnetic sensor according to an embodiment of the present invention taken from circle 3 of FIG. 2 and rotated 90 degrees counterclockwise.

With reference now to FIG. 3, a magnetoresistive sensor 300 according to an embodiment of the invention includes a sensor stack 302. The sensor stack includes a magnetically pinned layer 304, a magnetically free layer 306 and a non-magnetic, electrically conductive spacer layer 308 sandwiched there between. It should be pointed out that although the sensor is being described in terms of a GMR sensor, it could also be a tunnel valve (TMR) sensor, in which the spacer layer 308 would be a non-magnetic, electrically insulating material such as alumina ($Al_2O_3$).

The pinned layer 304, may be one of several types of pinned layers, such as a simple pinned, AP pinned, self pinned or AFM pinned sensor. For purposes of simplicity, the sensor will be described herein as an AP pinned, AFM pinned sensor having an AP1 layer 310, AP2 layer 314, and a non-magnetic, AP coupling layer, such as Ru 312 sandwiched there between.

The AP1 and AP2 layers 310, 314 can be constructed of several magnetic materials such as, for example NiF or CoFe, and have magnetic moments 316, 318 that are pinned by exchange coupling of the AP1 layer 310 with a layer of antiferromagnetic material (AFM layer) 320 such as PtMn.

The presently described embodiment includes an in stack bias layer 328, but could also include laterally disposed hard bias layers formed at the sides of the sensor between the first and second leads 326, 324. The in stack bias layer 328 can be of various configurations, such as a magnetic material 327 that is exchange coupled with an AFM layer 329 and separated from the free layer 306 by a non-magnetic, electrically conductive de-coupling layer 331, or a simple layer of hard magnetic material such as CoPtCr. First and second fill layers 330, 332 fill the spaces between the leads 324, 326 at either side of the sensor stack 302. The fill material can be an electrically insulating material such as $Al_2O_3$, or could include a soft magnetic material such as NiFe along with a layer of insulation such as $Al_2O_3$, in which case the magnetic material could act as a side shield to prevent adjacent track interference. The $Al_2O_3$ insulation layer can be applied by atomic layer deposition which deposits the $Al_2O_3$ in a desired conformal manner. As will be discussed in greater detail below, a method of manufacturing a sensor according to an embodiment of the invention facilitates the use of such atomic layer deposition of $Al_2O_3$.

The sensor stack 302 may also include a capping layer 322, which can be for example Ta. The sensor 300 is being described herein as a CPP sensor, and as such the sensor stack 302 is sandwiched between first and second electrically conductive leads 324, 326 which are preferably constructed of a magnetic material such as NiFe so that they also function as magnetic shields. It should be pointed out, however, that the present invention can be practiced in a current in plane (CIP) GMR sensor, in which case the layers 324, 326 would be dielectric gap layers, such as $Al_2O_3$.

Figure 4:
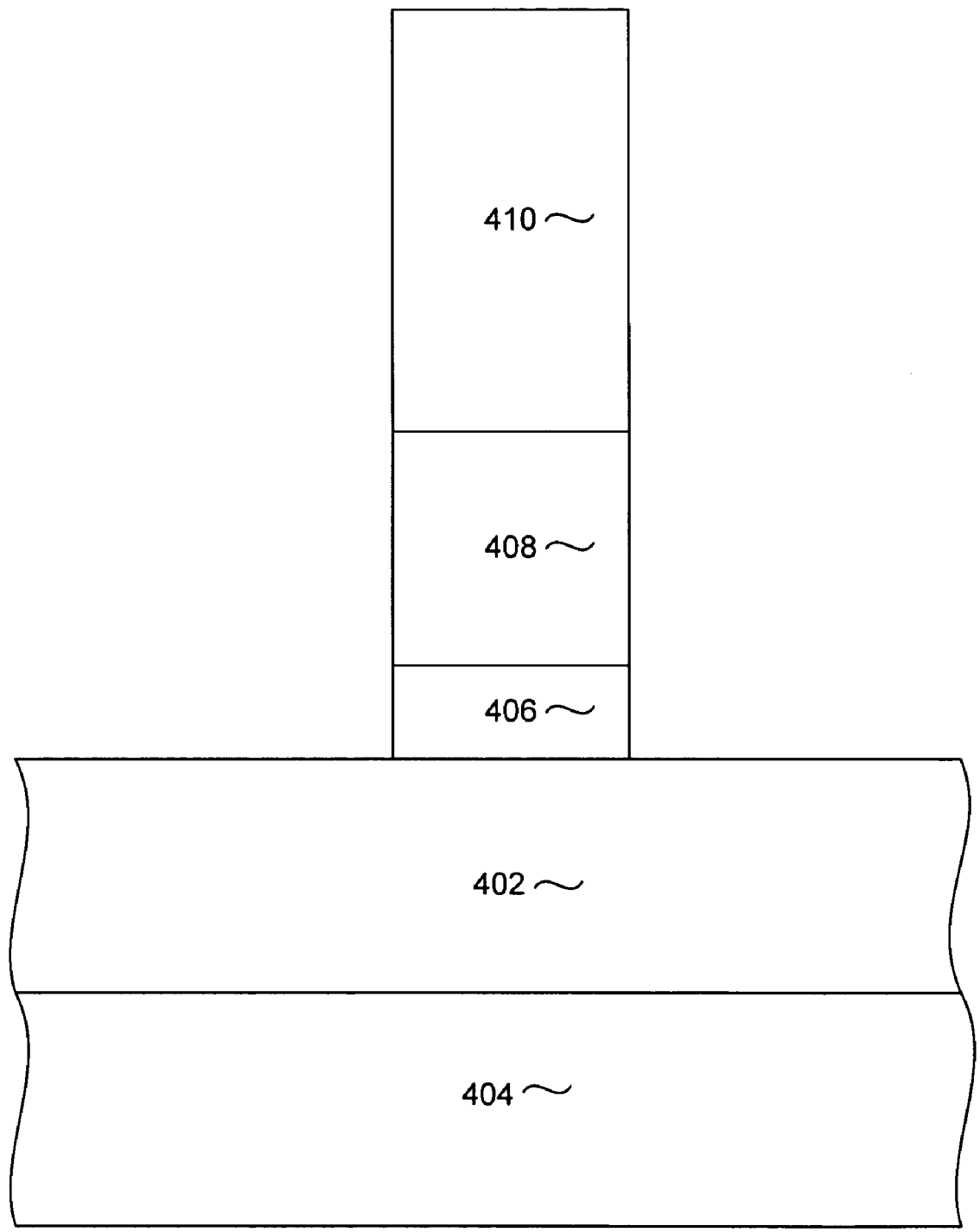
FIGS. 4-8 are ABS views of a magnetoresitive sensor in various intermediate stages of manufacture.

With reference to FIG. 4-9 a method for manufacturing a sensor 300 according to an embodiment of the invention is disclosed. With particular reference to FIG. 4, sensor layers 402 are deposited full film on a bottom magnetic shield 404. The sensor films can be films that will make up a CPP or CIP GMR sensor, a tunnel valve (TMR) sensor, or essentially any type of magnetoresistive sensor. In the case of a CIP sensor, a dielectric layer will be deposited between the bottom magnetic shield 404 and the sensor layers 402. A full film layer of CMP resistant material (CMP stop) 406, a layer of etch mask material 408 and a layer of photoresist material 410 are all deposited full film. Then, the photoresist 410 is photolithographically patterned, and this pattern is transferred to the underlying etch mask 408 and CMP stop 406. This can be done, for example, by applying a reactive ion etch to remove underlying etch mask 408 and CMP stop material 406 that is not covered by (ie. exposed by) the photoresist mask 410. This results in a series of masks 406, 408, 410 covering an area where the desired sensor stack 302 is to be.

Figure 5:
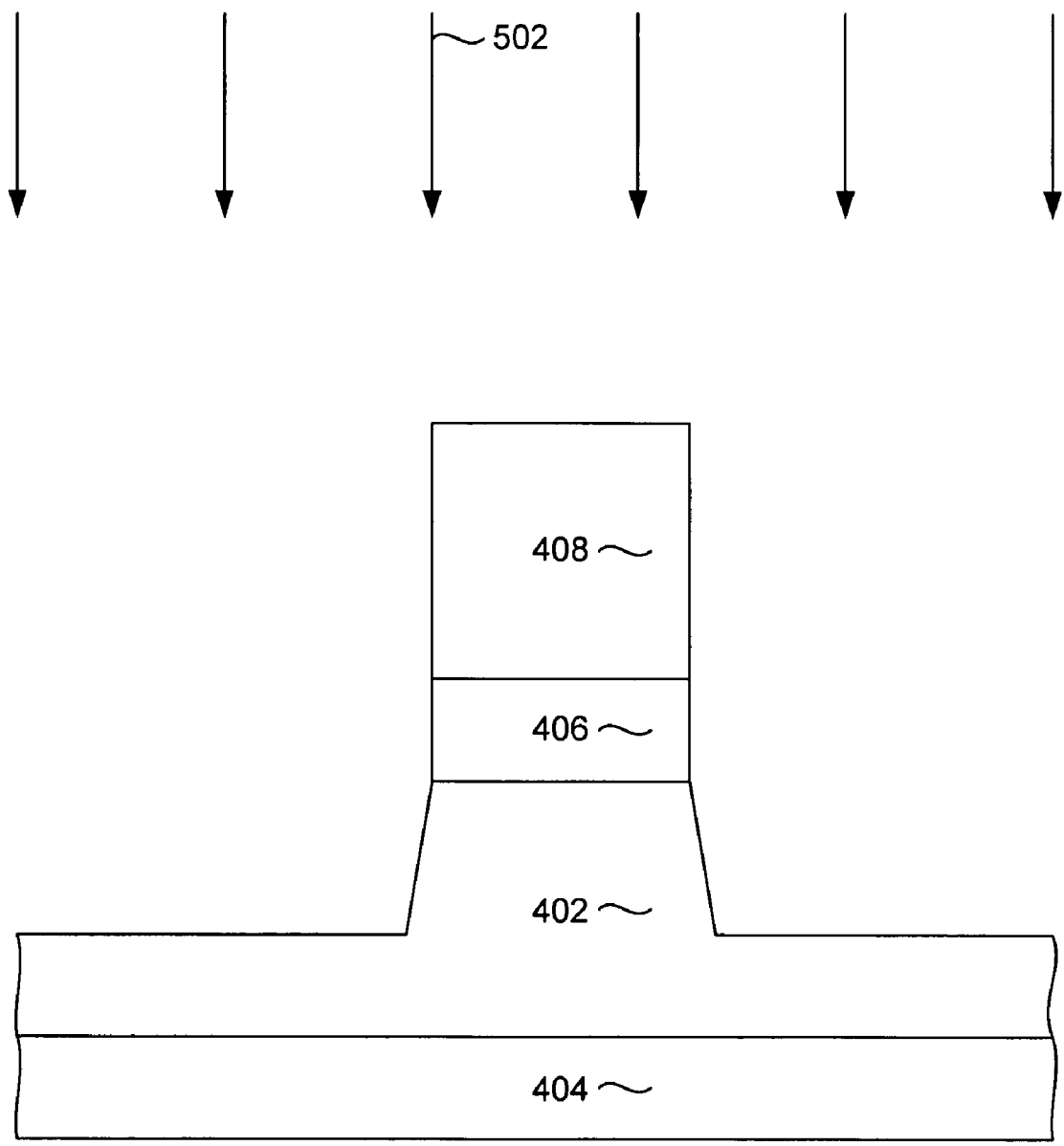

With reference now to FIG. 5, a material removal process 502 is performed. This material removal process can be, for example, an ion mill procedure or a reactive ion etch procedure, and is performed sufficiently to remove a desired amount of sensor material 402. For example the ion mill procedure 502 can be performed sufficiently to remove all of the sensor stack material 402, milling into the underlying substrate 404, or could be stop short of the substrate 404, leaving a portion of the senor material 402 as shown in FIG. 5.

With continued reference to FIG. 5, the material removal process 502 removes most or all of the photoresist mask 410

(FIG. 4). Therefore, it is important that the etch mask material 408 be constructed of material selected to be resistant to the material removal process 502 used to define the sensor. For example, Ta would be a preferable choice of etch mask material 408, if ion milling were chosen as the material removal process 502. Another possible material would be Alumina $Al_2O_3$. Other suitable materials for use in the etch stop mask 408 will likely become apparent to those skilled in the art and would fall within the scope of the present invention. The important consideration with regard to the present invention is that the material chosen for the etch stop material be resistant to the material removal process 502 used to define the sensor. Other important considerations for the selection of etch stop material 408, is that the material be resistant to high temperatures and that the material can be easily removed after the sensor has been defined.

Figure 6:
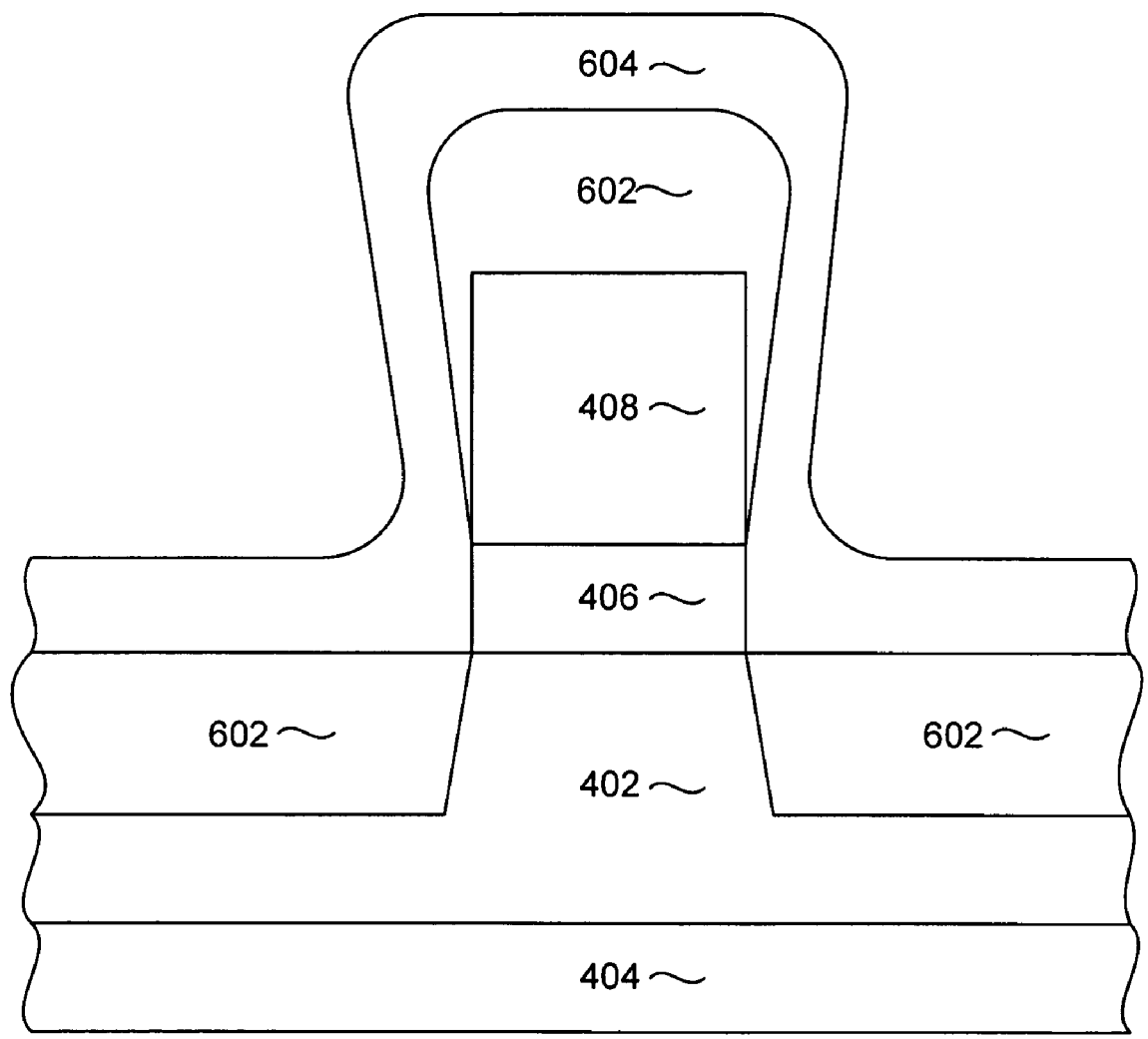

With reference now to FIG. 6, a fill material layer 602 is deposited full film. As discussed above, the fill material 602 for a CPP sensor can be a dielectric material such as $Al_2O_3$, a combination of dielectric material and magnetic material. The fill-material 602 for a CIP sensor could be a hard magnetic bias layer and an electrically conductive lead material such as Rh, Cu or Au. The fill material 602 could also be some other material or combination of materials. The high temperature resistance of the etch mask material 408 advantageously allows the $Al_2O_3$ to be deposited by atomic layer deposition, without the etch mask layer 408 being hard baked, shriveled or otherwise damaged by the high temperature needed for such deposition.

After the fill material 602 has been deposited, a layer of CMP resistant material 604, such as diamond like carbon DLC may optionally be deposited. It should be emphasized that the deposition of this CMP resistant material 604 is optional, but the presence of this material 604 can be advantageous in preventing removal of the fill material 602, such as in the field of the wafer, during a subsequent CMP process that will be described shortly. The material 604 is preferably the same material as the CMP stop layer 406, and is preferably of the same or similar thickness as the CMP stop layer 406 in order that it may be removed at the same rate as the CMP stop layer 406.

Figure 7:
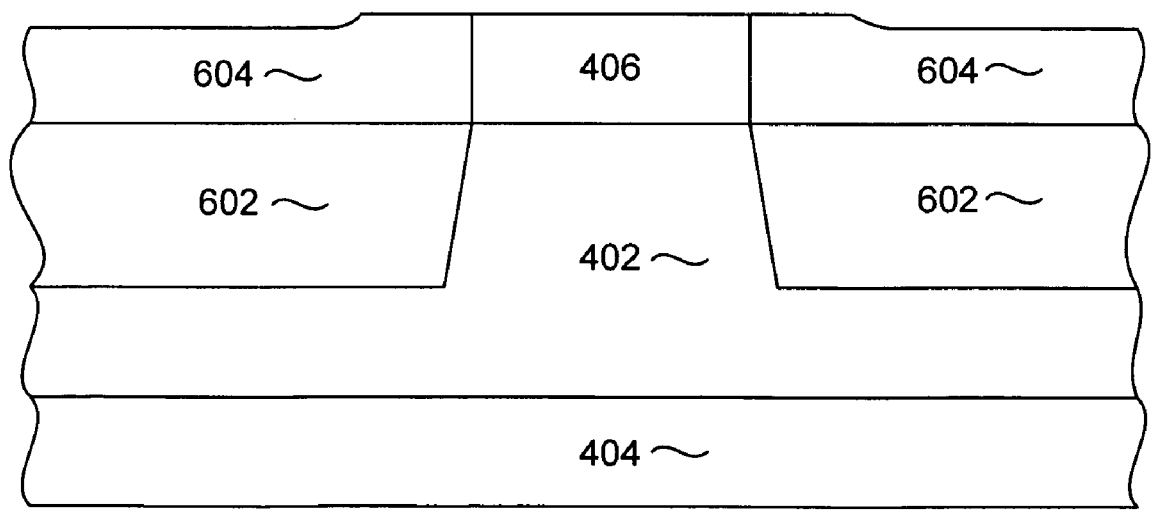

With reference now to FIG. 7, a chemical mechanical polishing process (CMP) is performed, which removes the etch mask 408. It should be appreciated that, since the etch mask 408 was constructed of a material that was not readily removed by the previous material removal process 502, it will have a tall profile (ie. topography). This is important to its effective removal by the CMP process. CMP processes very selectively remove such tall structures. Therefore, even if the etch mask 308 is covered with a CMP resistant material 604, the etch stop 308 will still be readily knocked off and removed by the CMP process, resulting a structure as shown in FIG. 7.

Figure 8:
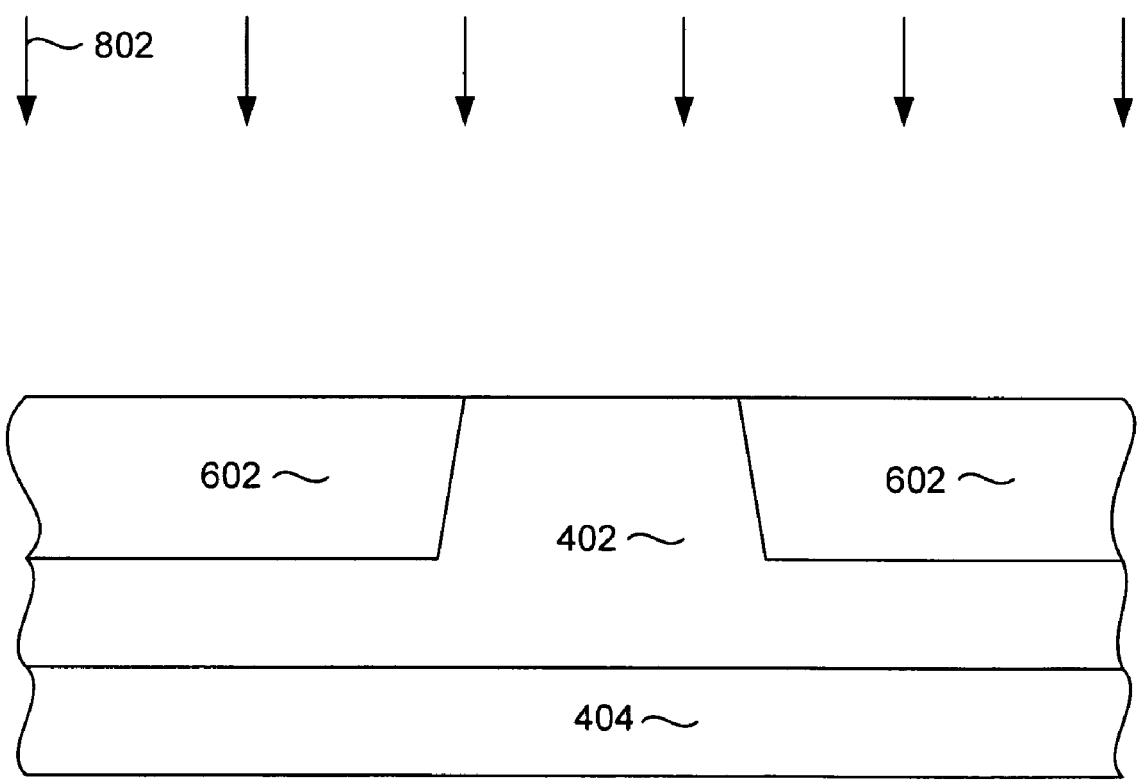

With reference to FIG. 8, a material removal process 802 such as reactive ion etch (RIE) can be used to remove the CMP stop 406, CMP resistant layer 604, and any remaining etch mask 408. Further manufacturing of the head 302, may then continue with the deposition of the upper lead/shield 326 (FIG. 3) or in the case of a CIP sensor a dielectric gap layer.

Figure 9:
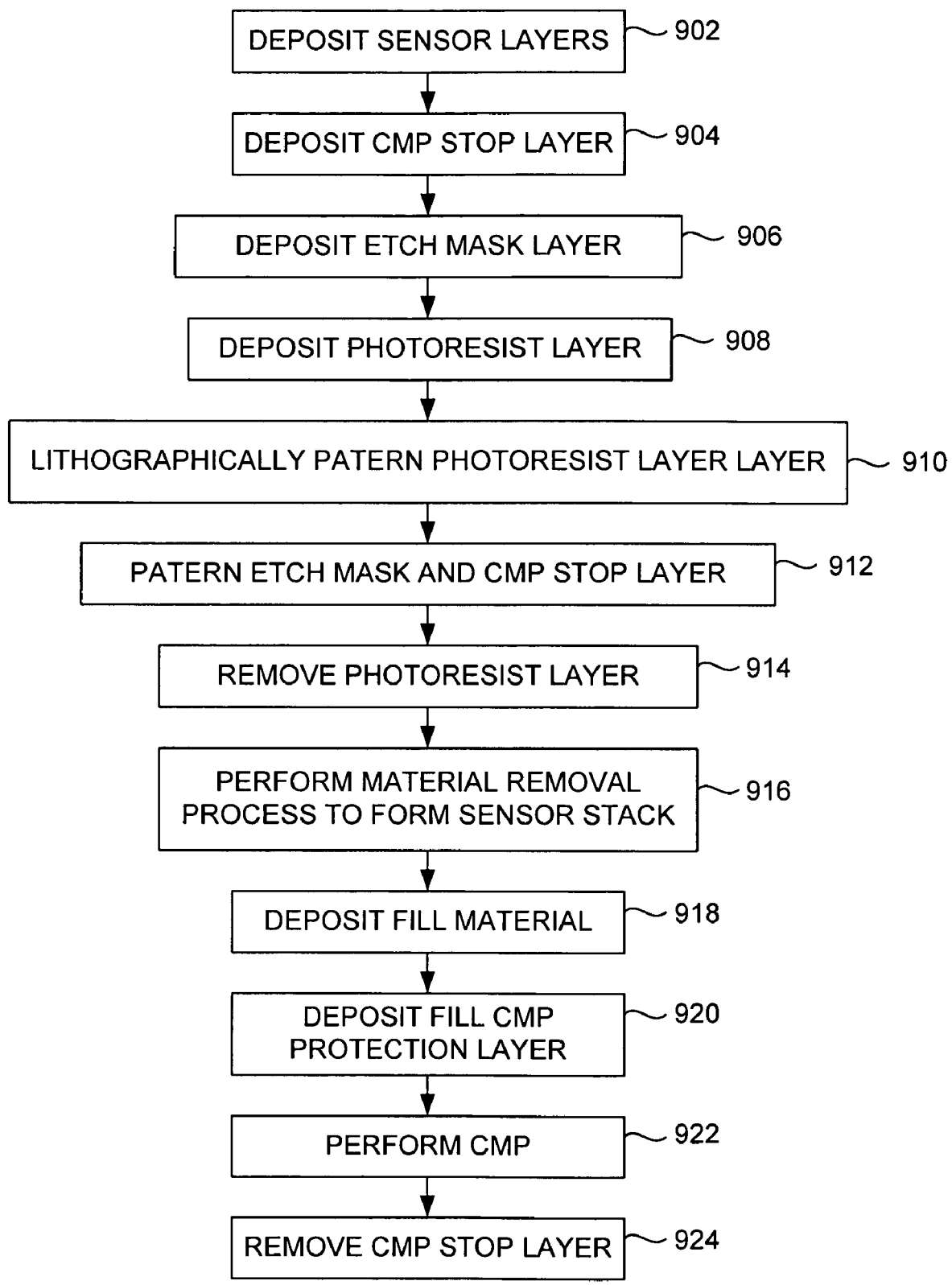
FIG. 9 is flowchart summarizing a method of manufacturing a magnetoresistive sensor according to an embodiment of the invention.

With reference now to FIG. 9, a process for constructing a magnetoresistive sensor according to an embodiment of the invention is summarized. In a step 902 a series of sensor layers are deposited. Then, in a step 904 a CMP stop layer, such as diamond like carbon (DLC) is deposited. Thereafter, in a step 906, a layer of etch mask material such as a dielectric like alumina or metal such as Ta is deposited. Then, in a step 908 a layer of photoresist material is deposited. The photoresist material can be organic or inorganic. Then, in a step 910, the photoresist is photolithographically patterned to form a mask that covers an area where the sensor stack is desired to be. Then, in a step 912, the patterned photoresist mask is transferred to the underlying etch stop layer and CMP stop layer. This transfer can be performed, for example, by applying a reactive ion etch or other suitable material removal process.

With continued reference to FIG. 9, in a step 914 the photoresist may optionally be lifted off. Then in a step, 916, a material removal process such as ion milling or reactive ion etching is performed to remove a desired amount of sensor material to form and define the sensor stack. Although optional, the removal (lift off) of the photoresist layer in step 914 will reduce shadowing effects and also prevent the redeposition of photoresist material on the sides of the sensor stack.

Thereafter, in a step 918 a fill material can be deposited. This fill material can be a dielectric material such as alumina, or could be a combination of a thin layer of alumina and a layer of hard magnetic material (hard bias layer) or a combination of a thin layer of alumina and a magnetically soft magnetic shield material. If the sensor is to be a CIP sensor, the fill material could include a seed layer, a magnetically hard bias layer material such as CoPtCr and an electrically conductive lead material such as Rh, Cu or Au.

After the fill material has been deposited, in an optional step 920 a layer of CMP resistant material such as diamond like carbon (DLC) can be deposited. Then, in a step 922 a CMP can be performed, removing the etch mask. In a step 924 a material removal process such as reactive ion etch (RIE) can be performed to remove the CMP stop layer and the CMP resistant material.

While various embodiments have been described above, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A method for manufacturing a magnetoresistive sensor, comprising:
depositing a plurality of sensor layers;
depositing a CMP stop material over the plurality of sensor layers;
depositing an etch mask material over the CMP stop material;
depositing a photoresist material over the etch mask material;
photolithographically patterning the photoresist material; and
performing a material removal process sufficiently to remove a desired amount of the sensor layers;
depositing an alumina fill layer by atomic layer deposition; and wherein
the etch mask material comprises a material that is resistant to removal by the material removal process, the etch mask material is resistant to high temperatures that are necessary to perform the atomic layer deposition of the alumina fill layer and is easily removed after the sensor has been formed.

2. A method as in claim 1, wherein the etch mask material comprises Ta.

3. A method as in claim 1, wherein material removal process comprises reactive ion etching.

4. A method as in claim 1, wherein the material removal process comprises ion milling.

5. A method as in claim 1, wherein the material removal process comprises ion milling and the etch mask material comprises Ta.

6. A method as in claim 1, wherein the etch mask material comprises an inorganic material.

7. A method as in claim 1, wherein the etch mask material comprises a metal.

8. A method as in claim 1, wherein the CMP stop material comprises diamond like carbon (DLC).

9. A method as in claim 1, further comprising, before performing the material removal process, transferring the photolithographically patterned photoresist material to the underlying etch mask material and the CMP stop material.

10. A method as in claim 1, further comprising, before performing the material removal process, transferring the photolithographically patterned photoresist material to the underlying etch mask layer and the CMP layer by performing a reactive ion etch (RIE).

11. A method as in claim 1, further comprising after performing the material removal process, the alumina fill layer is deposited, and then depositing a layer of CMP resistant material.

12. A method as in claim 1, further comprising after performing the material removal process and after depositing the alumina fill layer:

depositing a second layer of CMP resistant material; and performing a CMP.

13. A method as in claim 12 wherein the second CMP resistant material comprises diamond like carbon (DLC).

* * * * *